June 3, 1930.        J. REIF        1,761,586
WRENCH
Original Filed Sept. 11, 1926
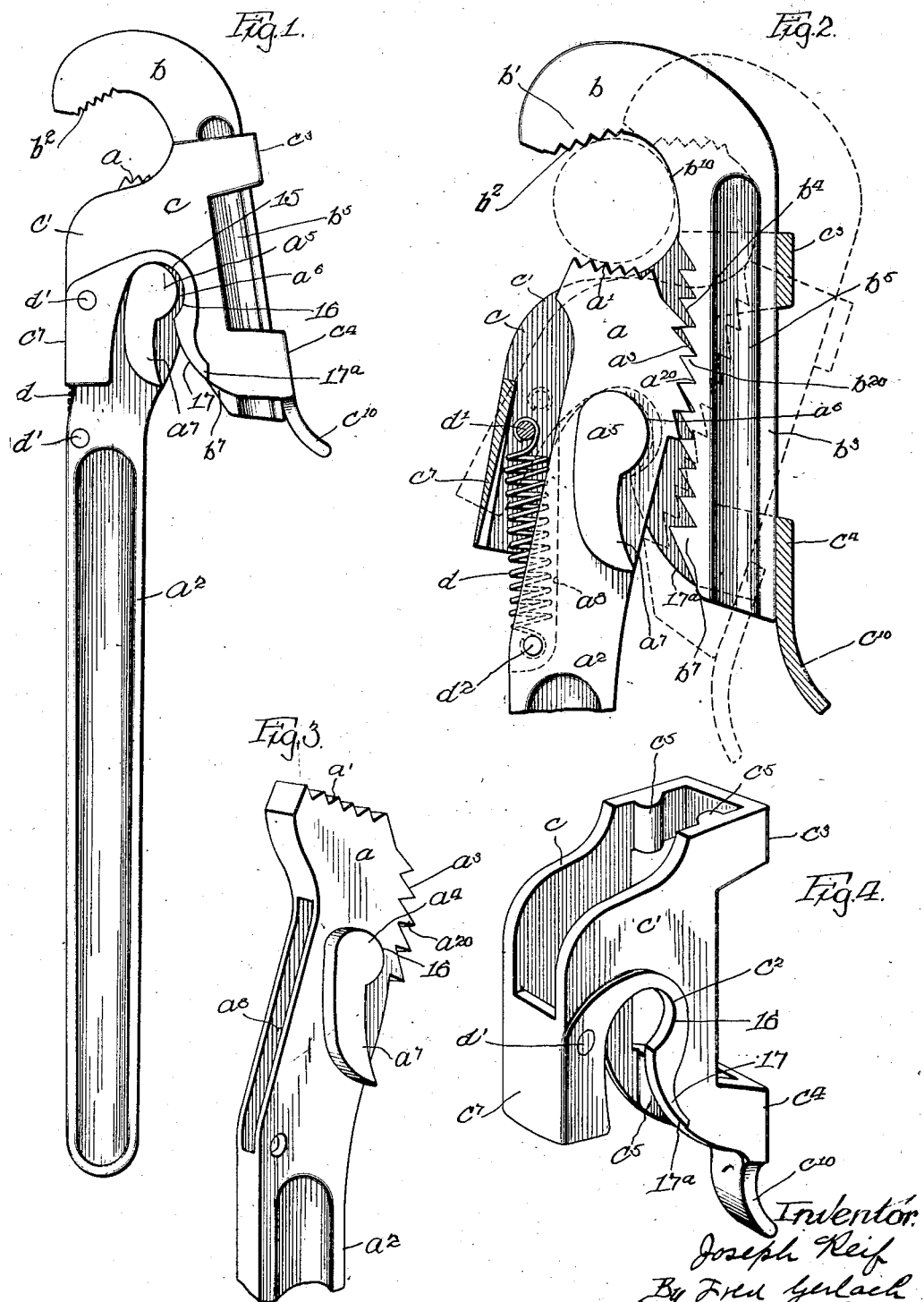
Inventor
Joseph Reif
By Fred Gerlach
His Atty.

Patented June 3, 1930

1,761,586

UNITED STATES PATENT OFFICE

JOSEPH REIF, OF HEBRON, INDIANA, ASSIGNOR OF ONE-HALF TO FRANCIS E. LING, OF HEBRON, INDIANA

WRENCH

Application filed September 11, 1926, Serial No. 134,791. Renewed April 2, 1930.

The invention relates to wrenches and more particularly to that type which is adapted for turning pipes, rods and the like.

The primary object of the invention is to provide an improved wrench of this type; in which the members are relatively movable to cause them to grip a part by movement of the handle and which is made up entirely of the two members and a frame or device for holding the members together; in which intermeshing teeth integral with the members respectively are utilized to draw the members together; in which the operating stresses are transmitted directly from one member to the other through directly intermeshing teeth on the members and not through the device for holding the members together; in which such intermeshing teeth may be readily disengaged to set the members for different spacings; which permits the members to slip easily around a pipe or rod in one direction while effectively gripping it when the members are turned in the other direction; which is simple in construction, as well as efficient in operation, so it can be produced at a low cost; and which may be readily assembled and dis-assembled. Other objects of the invention will appear from the detailed description.

The invention consists in the several novel features hereinafter set forth and more particularly defined by the claims at the conclusion hereof.

In the drawing: Fig. 1 is a side elevation of a wrench embodying the invention. Fig. 2 is a view on an enlarged scale, showing the gripping members in elevation and the frame in section. Fig. 3 is a perspective of the lever-member of the wrench. Fig. 4 is a perspective of the frame for holding the members in connected relation.

The invention is exemplified in a wrench comprising gripping members $a$ and $b$ and a frame $c$ adapted to hold the members together. Member $a$ is provided with teeth $a'$ forming a gripping jaw for one side of a pipe or other article and has an integral extension $a^2$ which forms an operating handle for the wrench. Member $b$ comprises an arm $b'$ formed with teeth $b^2$ substantially opposed to the teeth $a'$ on member $a$ and a stem $b^3$. The jaws are preferably shaped to engage a pipe a little to the outer side of the pipe axis so the other side of the pipe will bear against member $b$ at $b^{10}$, thus providing a three point engagement between the members and the pipe.

Member $b$ is provided with an integral straight series of ratchet teeth $b^4$ meshing with an opposed slightly arcuate series of ratchet teeth $a^3$ integrally formed on the member $a$. The holding faces $b^{20}$ of teeth $b^2$ on stem $b'$ and the holding faces $a^{20}$ of teeth $a'$ on member $a$ are corelated and abut so that when the handle $a^2$ is turned to the left teeth $a'$ will fulcrum on the pipe. Ratchet teeth $a^3$ will then force the ratchet teeth $b^4$ downwardly or in such a direction that the teeth $b^2$ will be forced toward the teeth $a'$ thus causing the pipe to be jammed between the opposing jaws on the members respectively. When, however, the handle $a^2$ is rotated in the opposite direction, the ratchet teeth $a^3$ on member $a$ will not force the intermeshing ratchet $b^4$ to move the jaws together and will permit them to freely slip around the article being turned. The purpose in arranging the teeth $a^3$ arcuately and the teeth $b^4$ rectilinearly, is to permit the relative rocking between the members necessary in drawing them together to grip the pipe when the handle is moved in one direction and to slip around it when the handle is moved in the opposite direction. A characteristic of this structure is that while the article is being gripped, as the result of turning the handle $a^2$ in one direction, the power applied to the handle will be transmitted directly from member $a$ to member $b$ and draw the jaws together and turn the pipe without passing such stresses through the frame.

The frame $c$ comprises integral sides $c'$ which extend across the sides of the members $a$ and $b$ to hold them in alignment, a front cross-wall $c^7$, and integral cross-bars $c^3$ and $c^4$ which extend in back of the stem $b^3$ to normally confine it so teeth $b^4$ will mesh with ratchet teeth $a^3$ of member $a$. Inwardly facing ribs $c^5$ are also formed on the frame-sides $c'$ to enter correspondingly faced grooves $b^5$ in the sides of the stem $b^3$ to slidably connect the frame member $b$ so that the latter may be adjusted to or from the member $a$ according to spacings desired between the jaws for pipes or rods of different sizes. This sliding connection also serves to swing the member $b$ with the frame in all of its adjustments.

Fulcrum and stop lugs $a^5$ are integrally formed with and project from the sides of the member $a$ and each has a round upper portion $a^6$ forming a pivot and an extension $a^7$ forming an abutment. The sides $c'$ of frame $c$ are notched around lugs $a^5$ and each notch comprises a round upper portion 16 extending loosely around the pivot portion $a^6$ of lug $a^5$ and a flared lower portion 17. The upper margin of each notch engages and fulcrums on the upper end of a pivot portion $a^6$. The lower portions 16 of the slots permit relative rocking of the member $a$ and frame $c$ while the handle $a^2$ is being operated in either direction, so the lever may jam the jaw of member $b$ against the pipe or permit stoppage during reverse movement of the handle. When it is desired to adjust the member $b$ for different sizes of pipes, the ratchet teeth $b^4$ must be disengaged from ratchet teeth $a^3$. This may be effected by pressing forwardly the finger piece $c^{10}$ formed on the back of the frame until the curved rear margins $17^a$ of the portions 17 of the frame-slots abut against the lower portions of the extensions $a^7$ of the lugs $a^5$. When so engaged, the frame will fulcrum on the lower portion of the extensions and because of the curvature of said extensions and the rear marginal portions $17^a$ will automatically swing the stem $b^3$ backwardly a sufficient distance to disengage the ratchet teeth of the members, so that member $b$ will be free to be slipped inwardly or outwardly to the diameter of the pipe to be turned.

A spring $d$ has one of its ends connected to a pin $d'$ held in the sides $c'$ of the frame $c$ and its other end hooked to a pin $d^2$ which is removably held in the member $a$. This spring normally applies its force to hold the frame seated on lugs $a^5$ so it will hold member $b$ intermeshed with member $a$. The spring automatically retracts the frame when it has been rocked to release stem $b^3$ for resetting. The front of the member $a$ is cut away as at $a^8$ to receive a portion of the spring $d$. A sufficient number of teeth $b^4$ are provided for connecting the stem $b^2$ to the teeth $a^3$ within the range of adjustment desired. A large tooth $b^7$ is formed adjacent the lower end of stem $b^3$ to strike the lowermost tooth $a^3$ and limit the movement of the member $b$ so that it cannot be withdrawn from the frame.

If for any reason it should be desired to separate the parts this can be done when the pin $d'$ is removed. The slots in the frame permit it to be lifted away from lugs $a^5$ and separated from the member $a$, when member $b$ is disengaged from member $a$.

In operation, power applied to the handle $a^2$ in one direction will be applied through the interengaging ratchet teeth $a^3$ and $b^4$ to jamb the jaws of the members into the pipe or rod to be gripped and thus insure an effective gripping thereof. This application of force is accomplished without subjecting the frame to any of the turning stresses, the latter merely serving to hold the members in connected relation. When the handle is rotated in the reverse direction, the members will automatically release or slip around the pipe or rod. When it is desired to adjust the jaws for different sizes of rods, it is only necessary to press the finger-piece $c^{10}$ toward the handle $a^2$ until the teeth $b^4$ are disengaged from the teeth $a^3$ whereupon the member $b$ may be slipped inwardly or outwardly, as desired to space the jaws to grip the desired rod or pipe.

The invention exemplifies a wrench which is adapted for gripping pipes or rods in which the force applied to the handle is not only applied to rotate the jaws but is also applied to force them together and against the rod or pipe. The stresses for effecting this result are applied directly from one member to the other through the intermeshing teeth. One member is readily and quickly adjustable to adapt the wrench for gripping rods or pipes of different sizes. The device, as an entity, is composed of a small number of parts, and can be manufactured at a low cost and is efficient in operation. While the jaws effectively grip a pipe or rod, they freely slip and will not lock on the pipe when the handle is reversely turned. The wrench is efficient with oval or other shapes as well as round pipes or rods.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a wrench, the combination of a pair of members, each provided with a gripping jaw, a handle rigid with one of the members, teeth on the members respectively intermeshing to force the jaws together by movement of the handle-member relatively to the other member, a frame for holding the members in connected relation, and a pivotal connection between the frame and the handle-member, said connection comprising lugs formed on the sides of the handle-member and slots formed in the frame, said slots having open ends to permit lateral insertion or withdrawal of the lugs.

2. In a wrench, the combination of a pair of members, each provided with a gripping jaw, a handle rigid with one of the members, teeth on the members respectively intermeshing to force the jaws together by movement of the handle-member relatively to the other member, a frame for holding the members in connected relation, a rocking connection between the frame and the handle-member, said connection comprising lugs formed on the sides of the handle-member and slots formed in the frame, and abutments formed on the sides of said handle-member and coacting with the surfaces of the frame which form the slots to limit the rocking movement of the frame relatively to the handle-member.

3. In a wrench, the combination of a pair of members, each provided with a gripping jaw, a handle rigid with one of the members, teeth on the members respectively intermeshing to force the jaws together by movement of the handle-member relatively to the other member, a frame for holding the members in connected relation, a rocking connection between the frame and the handle-member, said connection comprising lugs formed on the sides of the handle-member and slots formed in the frame, said lugs having extensions forming abutments, said abutments coacting with the surfaces of the frame which form the slots to limit the rocking movement of the frame relatively to the handle-member.

4. In a wrench, the combination of a frame-member, an element comprising a jaw and a stem, said stem being confined in the frame to sliding movement only and embodying a series of teeth at one side thereof, a member extending through the frame-member and comprising a jaw adapted to operate in conjunction with the jaw of the element, a handle rigidly connected to the jaw-carrying member, said last mentioned member embodying teeth at one side thereof meshing with the teeth of the stem and operable when the handle is swung in one direction relatively to the frame-member to draw the jaws together, a rocking connection between the frame-member and the jaw-carrying member whereby the handle may be swung relatively to said frame-member, comprising a lug carried by one of the members and loosely mounted in a socket in the other member, and means operative in response to swinging movement of the handle in the opposite direction relatively to the frame-member to effect relative shift of the two members and disengagement of the teeth for jaw adjusting purposes.

5. In a wrench, the combination of a frame-member, an element comprising a jaw and a stem, said stem being confined in the frame to sliding movement only and embodying a series of teeth at one side thereof, a member extending through the frame-member and comprising a jaw adapted to operate in conjunction with the jaw of the element, a handle rigidly connected to the jaw-carrying member, said last mentioned member embodying teeth at one side thereof meshing with the teeth of the stem and operable, when the handle is swung in one direction relatively to the frame-member, to draw the jaws together, a rocking connection between the frame-member and the jaw-carrying member whereby the handle may be swung relatively to said frame-member, comprising a lug carried by one of the members and loosely mounted in a socket in the other member, and coacting parts on the two members located adjacent the lug and operative in response to swinging movement of the handle in the opposite direction relatively to the frame-member to effect relative shift of said two members and disengagement of the teeth for jaw adjusting purposes.

6. In a wrench, the combination of a frame, an element comprising a jaw and a stem, said stem being confined in the frame to sliding movement only and embodying a series of teeth at one side thereof, a member extending through the frame and comprising a jaw adapted to operate in conjunction with the jaw of the element, a handle rigidly secured to the member, said member embodying teeth at one side thereof meshing with the teeth of the stem and operable when the handle is swung in one direction relatively to the frame to draw the jaws together, a rocking connection between the frame and said member whereby the handle may be swung relatively to the frame, comprising a lug carried by the member and loosely mounted in a socket in the frame, and coacting parts on the frame and member located adjacent the lug and operative in response to swinging movement of the handle in the opposite direction relatively to the frame to effect relative shift of the frame and member and disengagement of the teeth for jaw adjusting purposes.

7. In a wrench, the combination of a pair of members each provided with a jaw, a handle connected rigidly to one of the members, intermeshing teeth on the members operative to draw the jaws together when the handle is swung in one direction relatively to the other member, a frame for holding the members in connected relation and a connection between the frame and the handle-member, said connection comprising a lug at one side of said handle-member, and a slot formed in the frame, said slot having an open end to permit lateral insertion or withdrawal of the lug.

Signed at Hebron, Indiana, this 31st day of August, 1926.

JOSEPH REIF.